United States Patent
Zimmer et al.

(10) Patent No.: US 11,875,147 B2
(45) Date of Patent: *Jan. 16, 2024

(54) FIRMWARE COMPONENT WITH SELF-DESCRIPTIVE DEPENDENCY INFORMATION

(71) Applicant: Intel Corporation, Santa Clara, CA (US)

(72) Inventors: Vincent Zimmer, Federal Way, WA (US); Jiewen Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,806

(22) Filed: Aug. 26, 2021

(65) Prior Publication Data

US 2021/0389944 A1     Dec. 16, 2021

Related U.S. Application Data

(63) Continuation of application No. 16/649,911, filed as application No. PCT/CN2017/103642 on Sep. 27, 2017, now Pat. No. 11,249,748.

(51) Int. Cl.
*G06F 8/71*     (2018.01)
*G06F 8/65*     (2018.01)

(52) U.S. Cl.
CPC . *G06F 8/71* (2013.01); *G06F 8/65* (2013.01)

(58) Field of Classification Search
CPC .............. G06F 8/71; G06F 8/65; G06F 8/654
See application file for complete search history.

(56) References Cited

U.S. PATENT DOCUMENTS

| | | |
|---|---|---|
| 10,481,893 B1 | 11/2019 | Righi et al. |
| 10,990,373 B2 | 4/2021 | Olderdissen et al. |
| 11,249,748 B2 * | 2/2022 | Zimmer .................... G06F 8/65 |
| 2008/0028395 A1 | 1/2008 | Motta et al. |
| 2011/0055799 A1 | 3/2011 | Kaulgud et al. |
| 2013/0074061 A1 * | 3/2013 | Averbuch ................ G06F 8/654 717/171 |

(Continued)

FOREIGN PATENT DOCUMENTS

| | | |
|---|---|---|
| CN | 104881311 A | 9/2015 |
| CN | 106325921 A | 1/2017 |
| CN | 106471468 A | 3/2017 |

OTHER PUBLICATIONS

International Search Report and Written Opinion for International Patent Application No. PCT/CN2017/103642, dated Jun. 15, 2018, 9 pages.

(Continued)

*Primary Examiner* — Marina Lee
(74) *Attorney, Agent, or Firm* — Jordan IP Law, LLC (57) ABSTRACT

An embodiment of a semiconductor package apparatus may include technology to determine version information for a new firmware component, read dependency information corresponding to the firmware component, and determine if dependency is satisfied between the new firmware component and one or more other firmware components based on the version information and the dependency information of the new firmware component. Other embodiments are disclosed and claimed.

20 Claims, 8 Drawing Sheets

(56) References Cited

U.S. PATENT DOCUMENTS

| | | |
|---|---|---|
| 2013/0111457 A1 | 5/2013 | Culter |
| 2013/0227542 A1* | 8/2013 | Pei ................ G06F 8/71 717/170 |
| 2014/0282457 A1* | 9/2014 | Chow ........... G06F 9/44521 717/164 |
| 2014/0359593 A1 | 12/2014 | Cohen et al. |
| 2014/0380340 A1 | 12/2014 | Knichel et al. |
| 2015/0067667 A1 | 3/2015 | Chan |
| 2015/0169320 A1* | 6/2015 | Ahmed ............ G06F 8/71 717/122 |
| 2016/0202964 A1* | 7/2016 | Butcher .......... G06F 8/654 717/172 |
| 2017/0039057 A1* | 2/2017 | Stefan ............. G06F 8/65 |
| 2019/0220271 A1 | 7/2019 | Olderdissen et al. |
| 2020/0310788 A1 | 10/2020 | Zimmer et al. |
| 2023/0023833 A1* | 1/2023 | Samuel ............ G06F 8/71 |

OTHER PUBLICATIONS

Notice of Allowance for U.S. Appl. No. 16/649,911, dated Oct. 5, 2021, 17 pages.

Non-Final Office Action for U.S. Appl. No. 16/649,911, dated May 13, 2021, 12 pages.

Extended European Search Report for European Patent Application No. 22151877.2-1203 dated Apr. 11, 2022, 10 pages.

International Search Report and Written Opinion for International Patent Application No. PCT/CN2017/103642, dated Apr. 13, 2021, 8 pages.

Intel, "Intel Platform Innovation Framework for EFI Pre-EFI Initialization Core Interface Specification (PEI CIS)," Sep. 2003, 196 pages.

* cited by examiner

FIRMWARE COMPONENT WITH SELF-DESCRIPTIVE DEPENDENCY INFORMATION

CROSS-REFERENCE TO RELATED APPLICATIONS

The present application is a Continuation Application which claims the benefit of priority to U.S. National Phase patent application Ser. No. 16/649,911 filed Mar. 23, 2020, which claims the benefit of priority to International Patent Application No. PCT/CN2017/103642 filed on Sep. 27, 2017.

TECHNICAL FIELD

Embodiments generally relate to data processing systems. More particularly, embodiments relate to a firmware component with self-descriptive dependency information.

BACKGROUND

Electronic processing systems may include basic input/output system (BIOS) and an operating system (OS). Firmware may be control code that is included in various components of the electronic processing system or devices attached to the electronic processing system.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
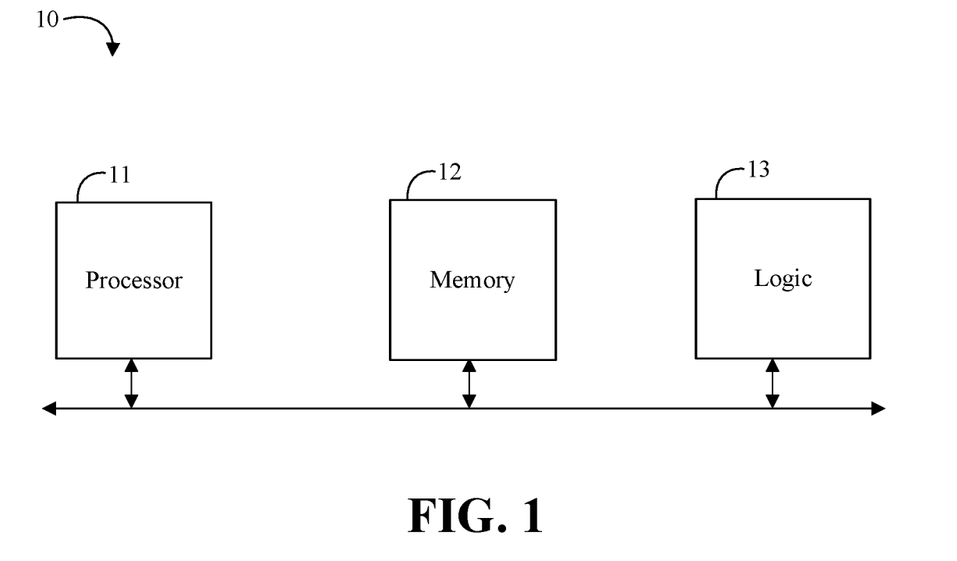
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to determine version information for a new firmware component, read dependency information corresponding to the firmware component, and determine if dependency is satisfied between the new firmware component and one or more other firmware components based on the version information and the dependency information of the new firmware component. In some embodiments, the logic 13 may be configured to store the self-descriptive dependency information corresponding to the new firmware component. For example, the self-descriptive dependency information may include one or more classes of firmware components on which the new firmware component is dependent together with a range of compatible versions for each of the one or more classes of firmware components. In some embodiments, the logic 13 may be configured to determine if dependency is satisfied between the new firmware component and all other related firmware components based on the version information and the dependency information of the new firmware component. For example, the logic 13 may also be configured to update the firmware with the new firmware component if dependency is satisfied between the new firmware component and all other related firmware components and/or to provide the dependency information to an operating system (e.g., the operating system of the electronic processing system 10).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, determining version information for a new firmware component of a firmware based on corresponding self-descriptive dependency information of the new firmware component, reading dependency information corresponding to the firmware component, determining if dependency is satisfied between the new firmware component and one or more other firmware components based on the version information and the dependency information, etc.).

Figure 2:
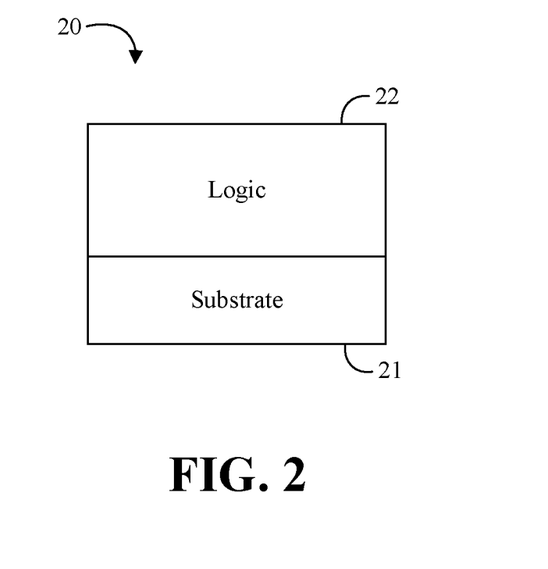
FIG. 2 is a block diagram of an example of a semiconductor package apparatus according to an embodiment.

Turning now to FIG. 2, an embodiment of a semiconductor package apparatus 20 may include a substrate 21, and logic 22 coupled to the substrate 21, where the logic 22 is at least partly implemented in one or more of configurable logic and fixed-functionality hardware logic. The logic 22 coupled to the substrate 21 may be configured to determine version information for a new firmware component of a firmware based on corresponding self-descriptive dependency information of the new firmware component, read dependency information corresponding to the firmware component, and determine if dependency is satisfied between the new firmware component and one or more other firmware components based on the version information and the dependency information of the new firmware component. In some embodiments, the logic 22 may be configured to store the self-descriptive dependency information corresponding to the new firmware component. For example, the self-descriptive dependency information may include one or more classes of firmware components on which the new firmware component is dependent together with a range of compatible versions for each of the one or more classes of firmware components. In some embodiments, the logic 22 may be configured to determine if dependency is satisfied between the new firmware component and all other related firmware components based on the version information and the dependency information of the new firmware component. For example, the logic 22 may also be configured to update the firmware with the new firmware component if dependency is satisfied between the new firmware component and all other related firmware components and/or to provide the dependency information to an operating system.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Figure 3A:
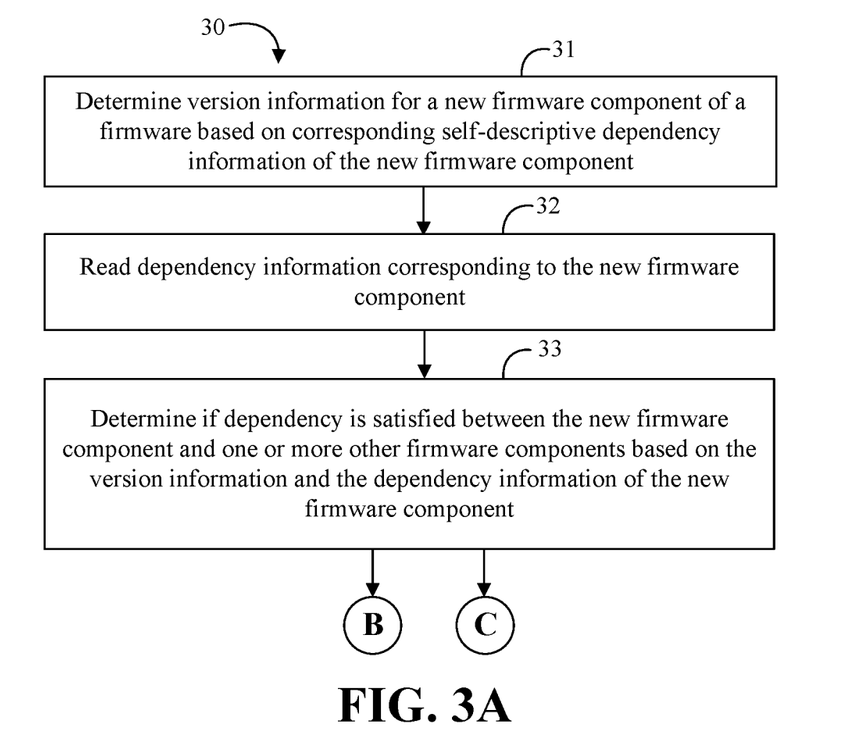
FIGS. 3A to 3C are flowcharts of an example of a method of firmware dependency checking according to an embodiment.
Figure 3B:
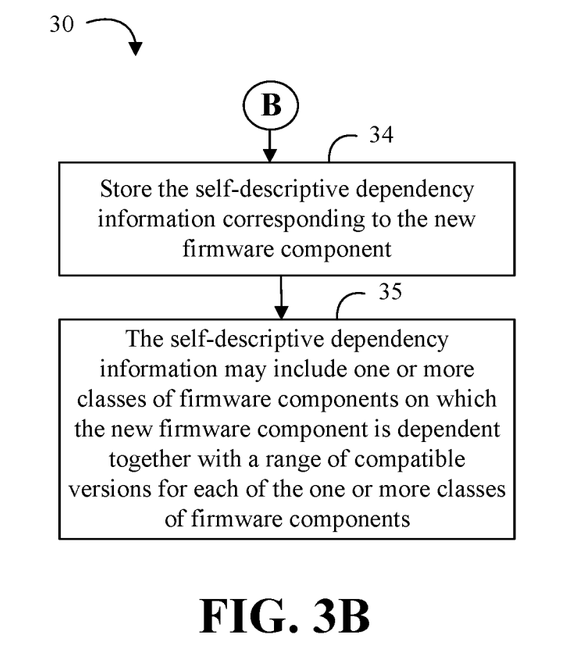
Figure 3C:
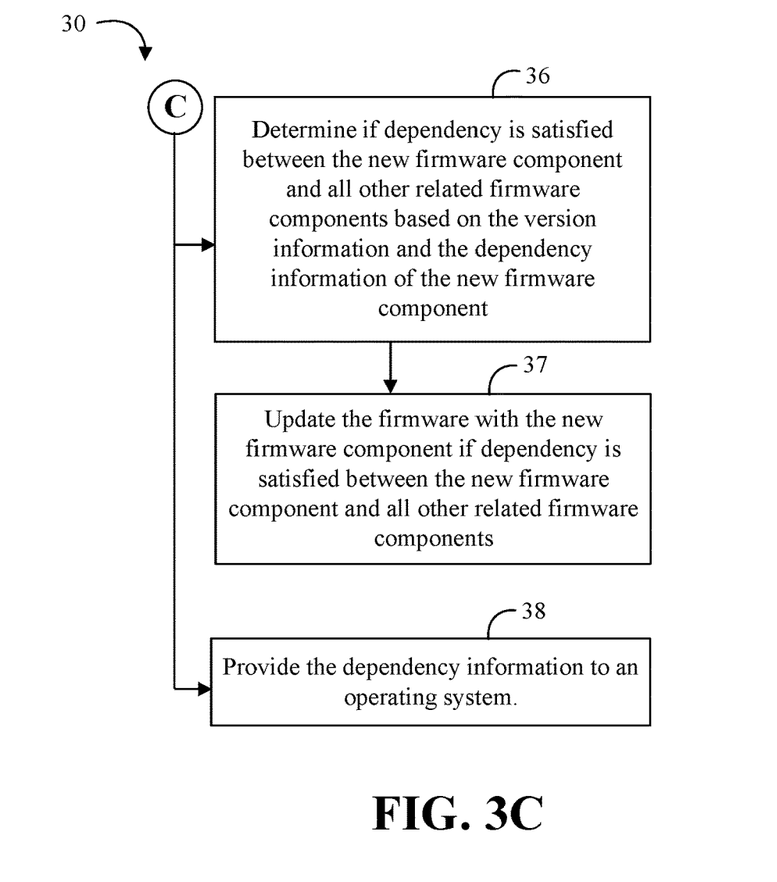

Turning now to FIG. 3, an embodiment of a method 30 of firmware dependency checking may include operations of determining version information for a new firmware component at block 31, reading dependency information corresponding to the firmware component at block 32, and determining if dependency is satisfied between the new firmware component and one or more other firmware components based on the version information and the dependency information at block 33. Some embodiments of the method 30 may include operations of storing self-descriptive dependency information corresponding to the new firmware component at block 34. For example, the self-descriptive dependency information may include one or more classes of firmware components on which the new firmware component is dependent together with a range of compatible versions for each of the one or more classes of firmware at block 35. Some embodiments of the method 30 may include operations of determining if dependency is satisfied between the new firmware component and all other related firmware components based on the version information and the dependency information at block 36, and updating the firmware with the new firmware component if dependency is satisfied between the new firmware component and all other related firmware components at block 37. For example, the method 30 may also include operations of providing the dependency information to an operating system at block 38.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on a BIOS or an OS.

Figure 4:
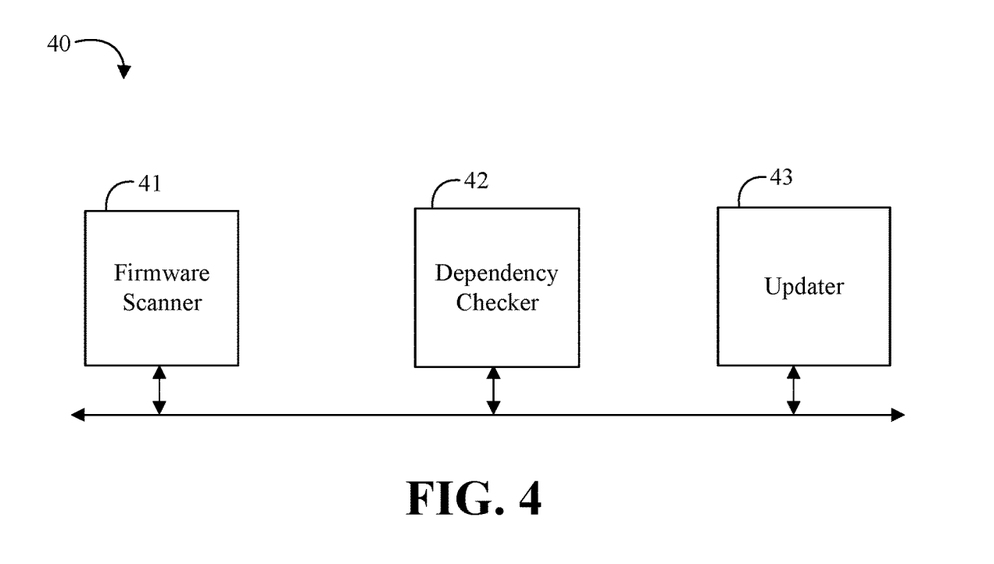
FIG. 4 is a block diagram of an example of firmware updater apparatus according to an embodiment.

Some embodiments may be physically or logically implemented as one or more modules or components. Turning now to FIG. 4, an embodiment of a firmware updater apparatus 40 may include a firmware scanner 41, a dependency checker 42, and an updater 43. The firmware scanner 41 may be configured to determine version information for a new firmware component of a firmware based on corresponding self-descriptive dependency information of the new firmware component, and to read dependency information corresponding to the firmware component. The dependency checker 42 may be configured to determine if dependency is satisfied between the new firmware component and one or more other firmware components based on the version information and the dependency information of the new firmware component. In some embodiments, the apparatus 40 and/or the new firmware component may store the self-descriptive dependency information corresponding to the new firmware component. For example, the self-descriptive dependency information may include one or more classes of firmware components on which the new firmware component is dependent together with a range of compatible versions for each of the one or more classes of firmware components. In some embodiments, the dependency checker 42 may be configured to determine if dependency is satisfied between the new firmware component and all other related firmware components based on the version information and the dependency information of the new firmware component. For example, the updater 43 may be configured to update the firmware with the new firmware component if dependency is satisfied between the new firmware component and all other related firmware components. In some embodiments, the firmware scanner 41 may also be configured to provide the dependency information to an operating system.

Embodiments of the firmware scanner 41, the dependency checker 42, the updater 43, and other components of the firmware updater apparatus 40, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Some embodiments may advantageously provide a system and/or method to support multiple firmware component update with self-descriptive dependency expressions. An extensible firmware interface (EFI) may provide an interface between firmware and an OS. The firmware may provide control/communication code between a hardware component/device and the EFI. The Unified Extensible Firmware Interface (UEFI) specification may define a software interface between an operating system and platform firmware (e.g., UEFI specification version 2.7, published May 2017 at www.uefi.org/sites/default/files/resources/UEFI_Spec_2_7.pdf). In some systems, UEFI may replace the BIOS firmware interface (e.g., most UEFI firmware implementations provide legacy support for BIOS services). Some implementations of UEFI may support remote diagnostics and repair, even with no operating system installed. In some systems, the UEFI EFI System Resource Table (ESRT) may include a globally unique identifier (GUID) per updatable component. Some firmware elements on a platform may have a dependency on other firmware elements. Some embodiments may provide a means by which to express these dependencies and build upon existing standards to provide a solution for platforms with many updatable elements. Such updatable elements may include, for example, management engine (ME) firmware, converged security manageability engine (CSME) firmware, core microcode, an INTEL firmware support package, and modular host UEFI firmware (e.g., which may have a large number of separate binary modules).

Figure 5:
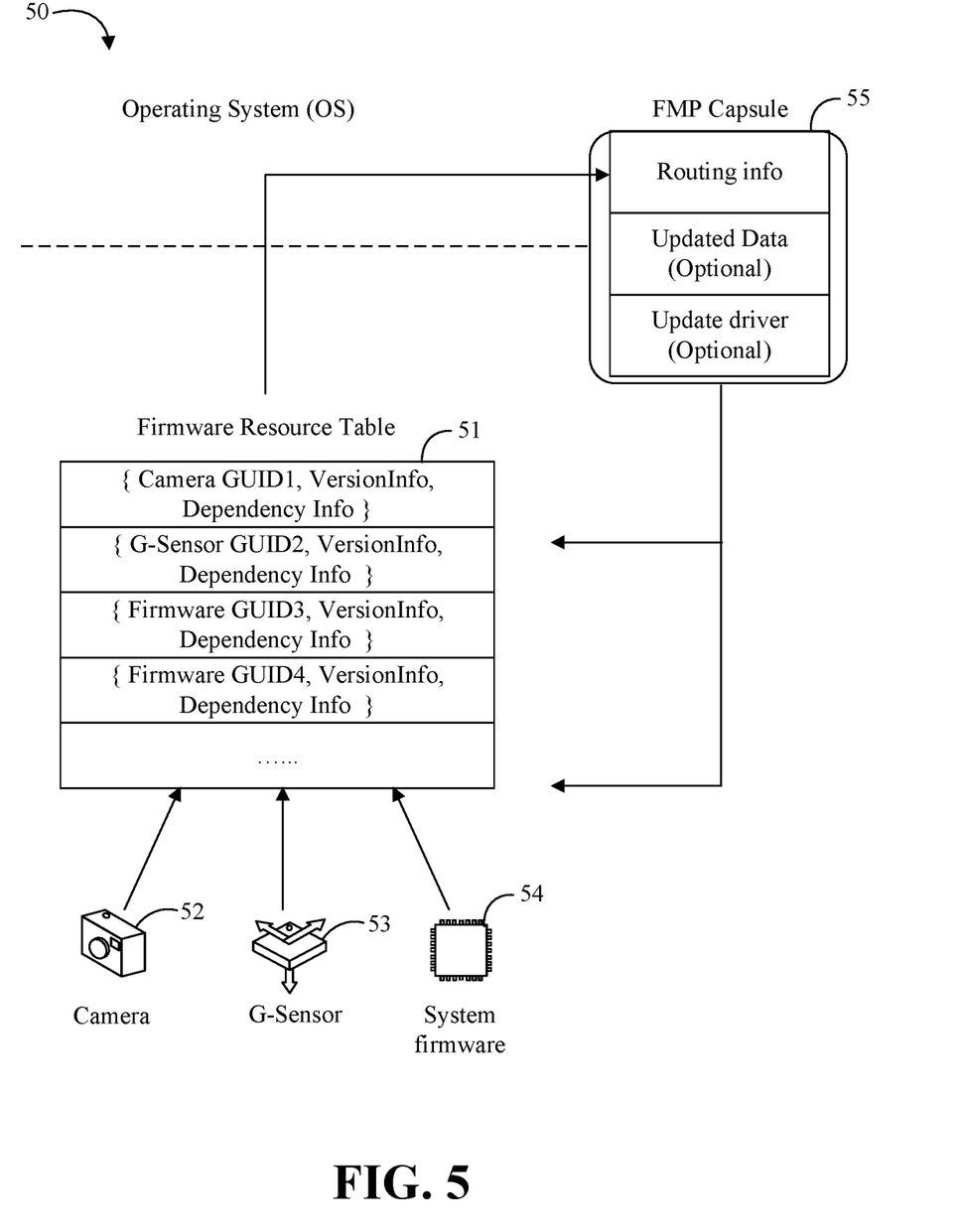
FIG. 5 is a block diagram of another example of an electronic processing system according to an embodiment.

Turning now to FIG. 5, an embodiment of an electronic processing system may include an OS (e.g., such as WINDOWS, REDHAT, etc.). A firmware resource table 51 may provide a GUID, version information, and dependency information for a number of devices/components connected to the OS (e.g., a camera 52, a G-sensor/accelerometer 53, other system components 54 with their own firmware, etc.). For example, the firmware resource table 51 may be similar to an UEFI ESRT (e.g., or the UEFI standard may be extended to accommodate the version dependency information). A firmware management protocol (FMP) capsule 55 may provide routing information, updated data, and/or an updated driver (e.g., an UEFI FMP capsule providing an updated UEFI driver) as part of a firmware update. For example, the OS may read the dependency information corresponding to a new firmware component of a firmware based on corresponding self-descriptive dependency information of the new firmware component, and determine if dependency is satisfied between the new firmware component and one or more other firmware components based on the version information and the dependency information of the new firmware component.

Security or other issues may prompt a firmware update (e.g., even in ME or CSME firmware). The end user or the original equipment manufacturer (OEM), however, may not want to have a component provider unilaterally update a binary module without having this update validated and delivered by the OEM or end user's full BIOS update. Updating ME or other firmware without an associated BIOS reference code update, for example, may cause problems with other system components. The same problem may occur for core microcode, because some microcode patches may make new hardware, like model specific registers (MSRs) appear, and the associated host firmware/BIOS may need to be updated in concert. Some systems may have numerous updatable firmware elements. Some component providers may release sets of firmware elements that must be updated together (e.g., as a best known configuration (BKC)).

Some embodiments may provide for a dependency between elements to be expressed in a software-visible way by updaters. Such dependency may even be exposed to OS updaters, such as a capsule updater. For example, WINDOWS may provide a MODEL BASED SERVICE (MBS) for firmware updates. LINUX may promote a firmware update project (FWUPD), and may provide a LINUX VENDOR FIRMWARE SERVICE (LVFS). Such projects and/or services may benefit from having dependency exposed to the OS as described in accordance with some embodiments herein.

Some embodiments may help ameliorate the OEM concerns on having component-based updates by providing a means by which to support a safe update of dependent modules on platforms and help remove friction for pushing updates in response to product response team (PRT) actions, both functional and security-based. Some embodiments may provide robust field-updatable hardware to avoid recalls but also support fast patching to avoid having customer exposure to security risks.

Firmware update may be an important feature in some electronic systems/platforms. Some industry standards may describe a firmware update process and/or security requirements. For example, the UEFI specification may define an EFI_SYSTEM_RESOURCE_TABLE to identify the system firmware and device firmware to operating system. The data structures may be represented as follows:

```
typedef struct {
  UINT32 FwResourceCount;
  UINT32 FwResourceCountMax;
  UINT64 FwResourceVersion;
  //EFI_SYSTEM_RESOURCE_ENTRY Entries[ ];
} EFI_SYSTEM_RESOURCE_TABLE;
typedef struct {
  EFI_GUID FwClass;
  UINT32 FwType;
  UINT32 FwVersion;
  UINT32 LowestSupportedFwVersion;
  UINT32 CapsuleFlags;
  UINT32 LastAttemptVersion;
  UINT32 LastAttemptStatus;
} EFI_SYSTEM_RESOURCE_ENTRY;
```

An OS may utilize the EFI_SYSTEM_RESOURCE_TABLE to manage the firmware of the system(s) and allow a provider and/or user perform firmware updates. A problem may occur in some system if utilization of the EFI_SYSTEM_RESOURCE_TABLE assumes that the identified firmware may be updated independently. In some systems, however, there might be multiple firmware components on one platform which may have some dependency on each other. For example, a system BIOS may need to work with a particular version of microcode. A client system BIOS may need to work with a particular version of ME firmware and a particular version of embedded controller (EC) firmware. A server system BIOS may need to work with a particular version of baseboard management controller (BMC) firmware. A system BIOS may need to work with a particular version of wireless network interface card (NIC) microcode, or BLUETOOTH LOW ENERGY (BLE) firmware. If a mistake is made, or the dependency is otherwise broken, the system may fail to boot, or experience other issues, and it may be hard to detect the problem.

For security considerations, there may be situations where the end user may need or prefer to update only one of the firmware components. But the end user may not know if it is proper to update only one of the firmware components or different firmware components need to be updated together. Some providers may recommend that the end user always updates all firmware on their system, or may hardcode some dependency check in the firmware code. Updating all of the firmware may avoid dependency problems between the new firmware, but could cause problems if the old platform does not work with all of the new firmware. Hardcoding some dependency checks may avoid some dependency issues, but the dependency information remains hidden and the hardcoding is inflexible for further extensions/updates. The hardcoded dependency check may not occur until after the update, requiring the end user to roll back the firmware after receiving an error.

Some embodiments may advantageously provide a way to describe the firmware version dependency clearly and expose such information to the OS. A commercial OS may present such information to the end user. A pre-check may be performed when the user wants to update the firmware in the OS environment, advantageously ensuring that dependencies are satisfied prior to updating the firmware. Some embodiments may provide an architecture way to report firmware dependency in addition to firmware version. Some embodiments may pass the dependency information to the OS and show the information to the end user. Some embodiments may advantageously inhibit or prevent a user/provider mistake in a very early phase to maintain the system/platform in a healthy state.

Some embodiments may provide a self-descriptive firmware dependency definition as an extension to a data structure. The version dependency information may be reported by each firmware component. In some embodiments, the data structures may be represented as follows:

```
typedef struct {
UINT32 FwVersionBegin;
UINT32 FwVersionEnd;
} EFI_SYSTEM_FIRMWARE_VERSION_RANGE;
typedef struct {
EFI_GUID FwClass;
UINT32 VersionRangeCount;
EFI_SYSTEM_FIRMWARE_VERSION_RANGE
VersionRange[VersionRangeCount];
} EFI_SYSTEM_FIRMWARE_DEPENDENCY;
typedef struct {
EFI_GUID FwClass;
UINT32 FwVersion;
UINT32 DependencyCount;
EFI_SYSTEM_FIRMWARE_DEPENDENCY Dependency [DependencyCount];
} EFI_SYSTEM_RESOURCE_DEPENDENCY;
```

For example, if the current BIOS firmware (FwClassBios, version 21) depends on ME firmware (FwClassMe, version 32 and upper) and EC firmware (FwClassEc, between version 56 and version 59, or between version 61 and version 68), in some embodiments the dependency structure may be represented as follows:

```
EFI_SYSTEM_RESOURCE_ DEPENDENCY BiosEntry = {
.FwClass = FwClassBios;
.FwVersion = 21;
.DependencyCount = 2;
.Dependency[0].FwClass = FwClassMe;
.Dependency[0].VersionRangeCount = 1;
.Dependency[0].VersionRange[0]. FwVersionBegin = 34;
.Dependency[0].VersionRange[0]. FwVersionEnd = 0xFFFFFFFF;
.Dependency[1].FwClass = FwClassEc;
.Dependency[1].VersionRangeCount = 2;
.Dependency[1].VersionRange[0]. FwVersionBegin = 56;
.Dependency[1].VersionRange[0]. FwVersionEnd = 59;
.Dependency[1].VersionRange[1]. FwVersionBegin = 61;
.Dependency[1].VersionRange[1]. FwVersionEnd = 68;
}
```

If the current ME firmware (FwClassMe, version 34) depends on BIOS (FwClassBios, version>=19), in some embodiments the dependency structure may be represented as follows:

```
EFI_SYSTEM_RESOURCE_ DEPENDENCY MeEntry = {
.FwClass = FwClassMe;
.FwVersion = 34;
.DependencyCount = 2;
.Dependency[0].FwClass = FwClassBios;
.Dependency[0].VersionRangeCount = 1;
.Dependency[0].VersionRange[0]. FwVersionBegin = 19;
.Dependency[0].VersionRange[0]. FwVersionEnd = 0xFFFFFFFF;
}
```

Figure 6:
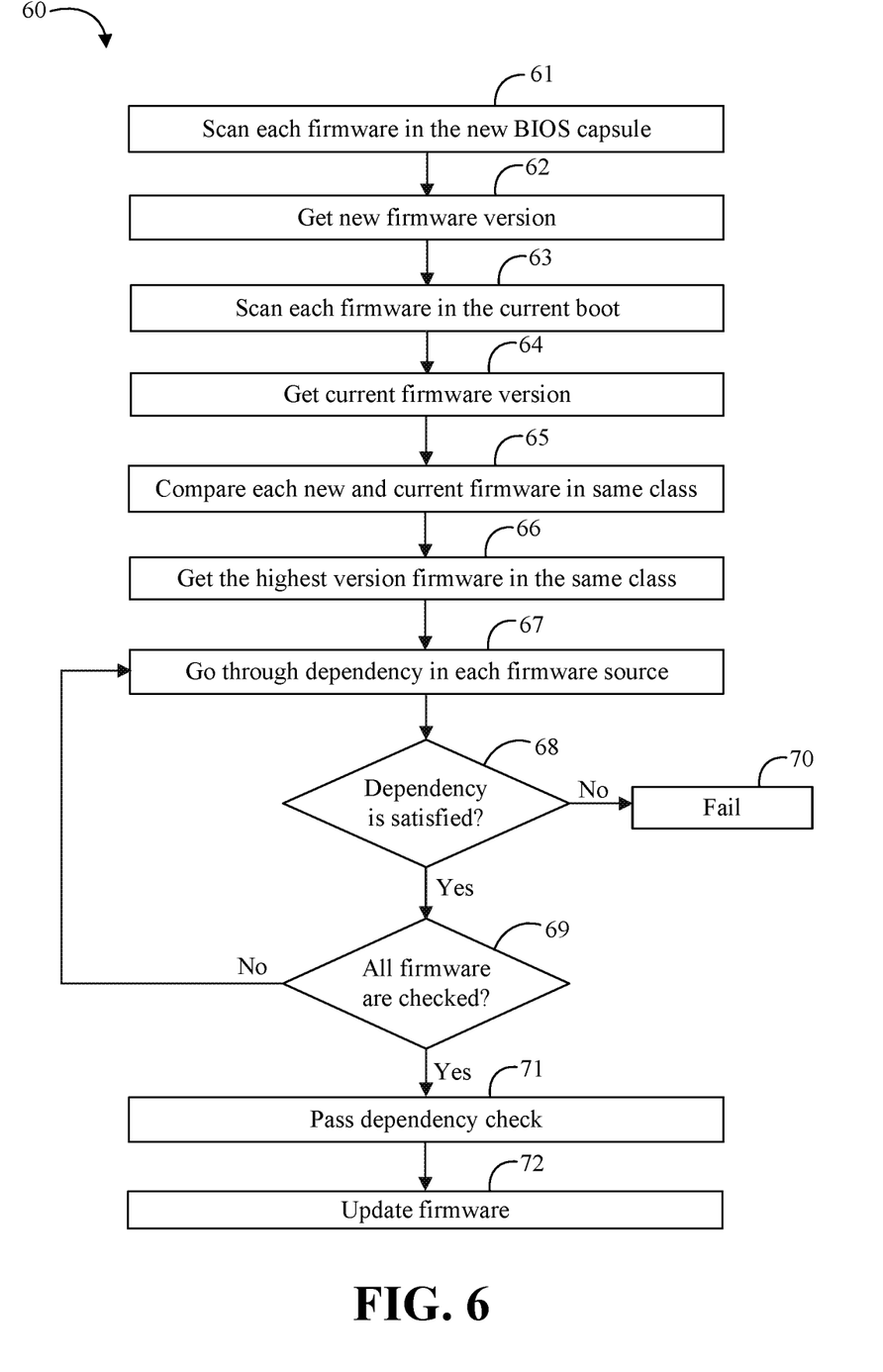
FIG. 6 is a flowchart of an example of a method of self-descriptive firmware updating and dependency checking according to an embodiment.

Turning now to FIG. 6, an embodiment of a method 60 of self-descriptive firmware updating and dependency checking may include scanning each firmware in the new BIOS capsule package at block 61, getting the new firmware version at block 62, scanning each firmware component in the current boot environment at block 63, getting the current firmware version at block 64, comparing each new and current firmware component in the same firmware class at block 65, and getting the highest version firmware in the same class at block 66. The method 60 may then go through the dependencies described in each firmware resource at block 67, and determine if the dependency is satisfied at block 68 until all the firmware components have been checked at block 69. If any dependency is not satisfied at block 68, the check may fail at block 70. The fail may be reported and the firmware update may be aborted. If all the firmware dependencies passed the dependency check at block 69, the method 60 may then report that the dependency check passed at block 71 and proceed with the firmware update at block 72.

For example, if the new firmware capsule update image has the following representative structure:

```
EFI_SYSTEM_RESOURCE_ DEPENDENCY BiosEntry = {
.FwClass = FwClassBios;
.FwVersion = 24;
.DependencyCount = 2;
.Dependency[0].FwClass = FwClassMe;
.Dependency[0].VersionRangeCount = 1;
.Dependency[0].VersionRange[0]. FwVersionBegin = 34;
.Dependency[0].VersionRange[0]. FwVersionEnd = 0xFFFFFFFF;
.Dependency[1].FwClass = FwClassEc;
.Dependency[1].VersionRangeCount = 2;
.Dependency[1].VersionRange[0]. FwVersionBegin = 56;
.Dependency[1].VersionRange[0]. FwVersionEnd = 59;
.Dependency[1].VersionRange[1]. FwVersionBegin = 61;
.Dependency[1].VersionRange[1]. FwVersionEnd = 68;
}
EFI_SYSTEM_RESOURCE_DEPENDENCY MeEntry = {
.FwClass = FwClassMe;
.FwVersion = 49;
.DependencyCount = 2;
.Dependency[0].FwClass = FwClassBios;
.Dependency[0].VersionRangeCount = 1;
.Dependency[0].VersionRange[0]. FwVersionBegin = 26;
.Dependency[0].VersionRange[0]. FwVersionEnd = 0xFFFFFFFF;
}
``` then the new ME firmware will not be updated, because its BIOS dependency (version 26) cannot be satisfied.

If the new firmware capsule update image has following representative structure:

```
EFI_SYSTEM_RESOURCE_ DEPENDENCY BiosEntry = {
.FwClass = FwClassBios;
.FwVersion = 27;
.DependencyCount = 2;
.Dependency[0].FwClass = FwClassMe;
.Dependency[0].VersionRangeCount = 1;
.Dependency[0].VersionRange[0]. FwVersionBegin = 40;
.Dependency[0].VersionRange[0]. FwVersionEnd = 0xFFFFFFFF;
.Dependency[1].FwClass = FwClassEc;
.Dependency[1].VersionRangeCount = 2;
.Dependency[1].VersionRange[0]. FwVersionBegin = 56;
.Dependency[1].VersionRange[0]. FwVersionEnd = 59;
.Dependency[1].VersionRange[1]. FwVersionBegin = 61;
.Dependency[1].VersionRange[1]. FwVersionEnd = 68;
}
EFI_SYSTEM_RESOURCE_DEPENDENCY MeEntry = {
.FwClass = FwClassMe;
.FwVersion = 49;
.DependencyCount = 2;
.Dependency[0].FwClass = FwClassBios;
.Dependency[0].VersionRangeCount = 1;
.Dependency[0].VersionRange[0]. FwVersionBegin = 26;
.Dependency[0].VersionRange[0]. FwVersionEnd = 0xFFFFFFFF;
}
``` then both BIOS and ME will be updated, because dependency is satisfied.

Figure 7A:
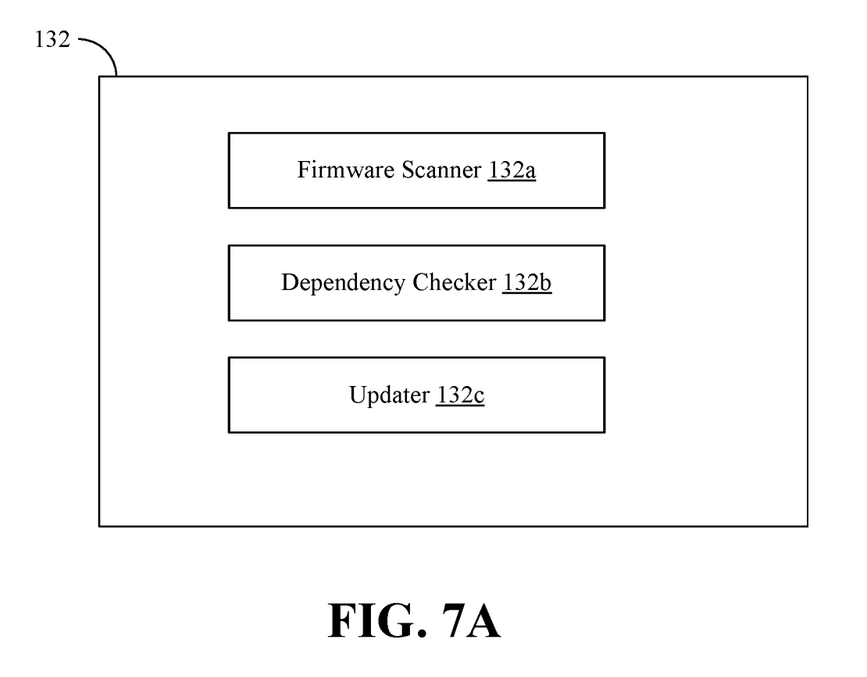
FIGS. 7A and 7B are block diagrams of examples of firmware updater apparatuses according to embodiments.

FIG. 7A shows a firmware updater apparatus 132 (132a-132c) that may implement one or more aspects of the method 30 (FIGS. 3A to 3C) and/or the method 60 (FIG. 6). The firmware updater apparatus 132, which may include logic instructions, configurable logic, fixed-functionality hardware logic, may be readily substituted for the logic 13 (FIG. 1) the logic 22 (FIG. 2), or the firmware updater apparatus 40 (FIG. 4), already discussed. The firmware scanner 132a may be configured to determine version information for a new firmware component of a firmware based on corresponding self-descriptive dependency information of the new firmware component, and to read dependency information corresponding to the firmware component. The dependency checker 132b may be configured to determine if dependency is satisfied between the new firmware component and one or more other firmware components based on the version information and the dependency information of the new firmware component. In some embodiments, the apparatus 132 and/or the new firmware component may store the self-descriptive dependency information corresponding to the new firmware component.

For example, the self-descriptive dependency information may include one or more classes of firmware components on which the new firmware component is dependent together with a range of compatible versions for each of the one or more classes of firmware components. In some embodiments, the dependency checker 132b may be configured to determine if dependency is satisfied between the new firmware component and all other related firmware components based on the version information and the dependency information of the new firmware component. For to example, the updater 132c may be configured to update the firmware with the new firmware component if dependency is satisfied between the new firmware component and all other related firmware components. In some embodiments, the firmware scanner 132a may also be configured to provide the dependency information to an operating system.

Figure 7B:
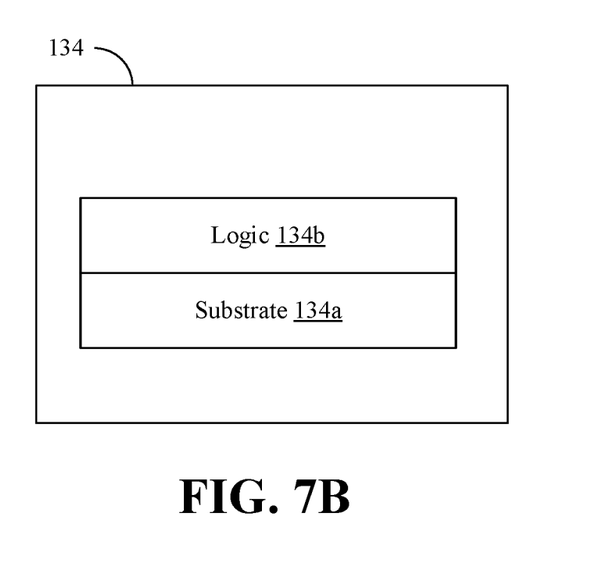

Turning now to FIG. 7B, firmware updater apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIGS. 3A to 3C) and/or the method 60 (FIG. 6). Thus, the logic 134b may determine version information for a new firmware component of a firmware based on corresponding self-descriptive dependency information of the new firmware component, read dependency information corresponding to the firmware component, and determine if dependency is satisfied between the new firmware component and one or more other firmware components based on the version information and the dependency information of the new firmware component. In some embodiments, the logic 134b may store the self-descriptive dependency information corresponding to the new firmware component. For example, the self-descriptive dependency information may include one or more classes of firmware components on which the new firmware component is dependent together with a range of compatible versions for each of the one or more classes of firmware components. In some embodiments, the logic 134b may determine if dependency is satisfied between the new firmware component and all other related firmware components based on the version information and the dependency information of the new firmware component. For example, the logic 134b may also update the firmware with the new firmware component if dependency is satisfied between the new firmware component and all other related firmware components and/or to provide the dependency information to an operating system. In one example, the apparatus 134 is a semiconductor die, chip and/or package.

Figure 8:
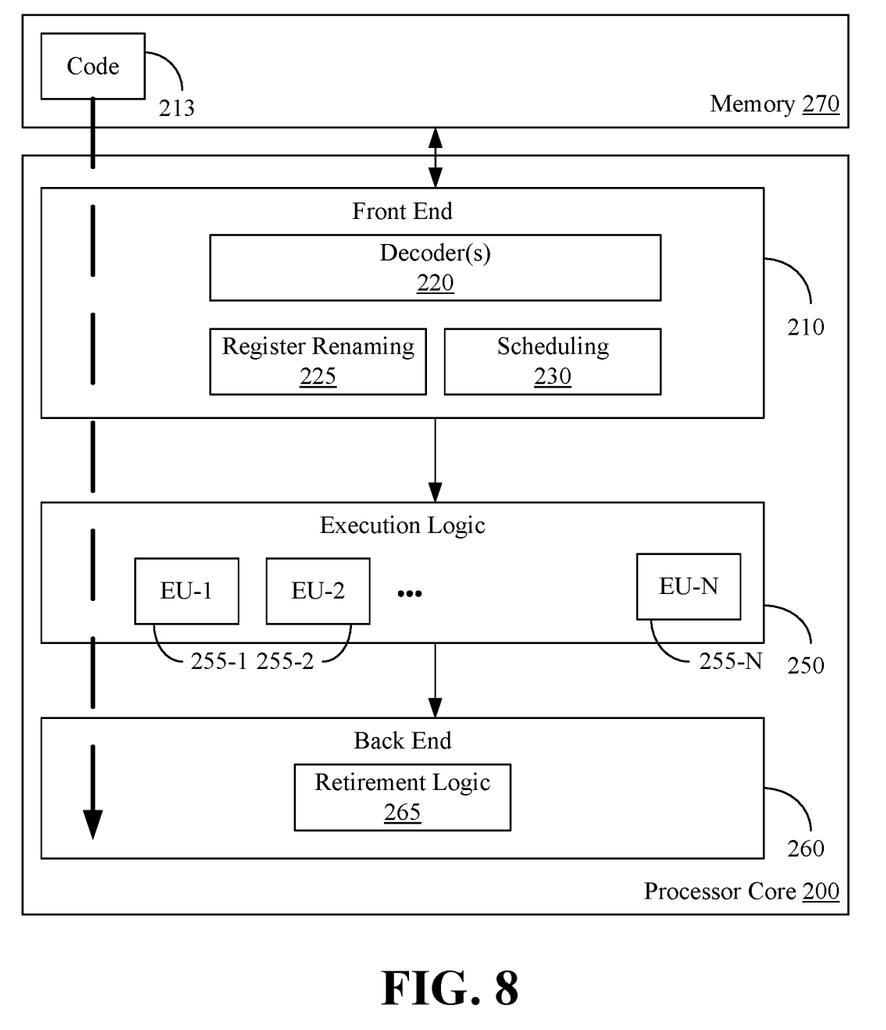
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3C) and/or the method 60 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
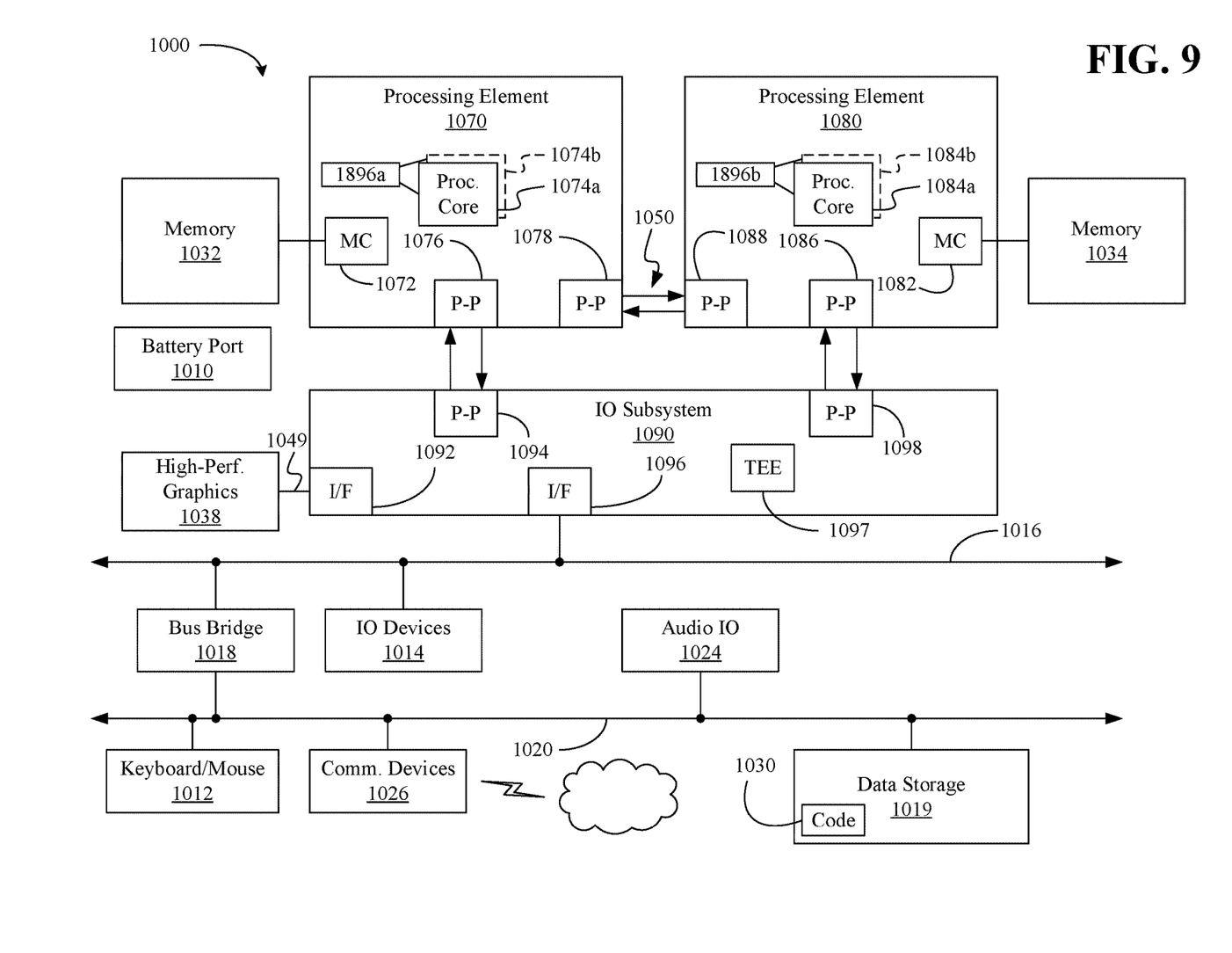
FIG. 9 is a block diagram of an example of a system according to an embodiment.

Referring now to FIG. 9, shown is a block diagram of a system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3C) and/or the method 60 (FIG. 6), already discussed, and may be similar to the code 213 (FIG. 8), already discussed. Further, an audio I/O 1024 may be coupled to second bus 1020.

Note that other embodiments are contemplated. For example, instead of the point-to-point architecture of FIG. 9, a system may implement a multi-drop bus or another such communication topology.

ADDITIONAL NOTES AND EXAMPLES

Example 1 may include an electronic processing system, comprising a processor, memory communicatively coupled to the processor, and logic communicatively coupled to the processor to determine version information for a new firmware component of a firmware based on corresponding self-descriptive dependency information of the new firmware component, read dependency information corresponding to the firmware component, and determine if dependency is satisfied between the new firmware component and one or more other firmware components based on the version information and the dependency information of the new firmware component.

Example 2 may include the system of Example 1, wherein the logic is further to store the self-descriptive dependency information corresponding to the new firmware component.

Example 3 may include the system of Example 2, wherein the self-descriptive dependency information includes one or more classes of firmware components on which the new firmware component is dependent together with a range of compatible versions for each of the one or more classes of firmware components.

Example 4 may include the system of Example 1, wherein the logic is further to determine if dependency is satisfied between the new firmware component and all other related firmware components based on the version information and the dependency information of the new firmware component.

Example 5 may include the system of Example 4, wherein the logic is further to update the firmware with the new firmware component if dependency is satisfied between the new firmware component and all other related firmware components.

Example 6 may include the system of any of Examples 1 to 5, wherein the logic is further to provide the dependency information to an operating system.

Example 7 may include a semiconductor package apparatus, comprising a substrate, and logic coupled to the substrate, wherein the logic is at least partly implemented in one or more of configurable logic and fixed-functionality hardware logic, the logic coupled to the substrate to determine version information for a new firmware component of a firmware based on corresponding self-descriptive dependency information of the new firmware component, read dependency information corresponding to the firmware component, and determine if dependency is satisfied between the new firmware component and one or more other firmware components based on the version information and the dependency information of the new firmware component.

Example 8 may include the apparatus of Example 7, wherein the logic is further to store the self-descriptive dependency information corresponding to the new firmware component.

Example 9 may include the apparatus of Example 8, wherein the self-descriptive dependency information includes one or more classes of firmware components on which the new firmware component is dependent together with a range of compatible versions for each of the one or more classes of firmware components.

Example 10 may include the apparatus of Example 7, wherein the logic is further to determine if dependency is satisfied between the new firmware component and all other related firmware components based on the version information and the dependency information of the new firmware component.

Example 11 may include the apparatus of Example 10, wherein the logic is further to update the firmware with the new firmware component if dependency is satisfied between the new firmware component and all other related firmware components.

Example 12 may include the apparatus of any of Examples 7 to 11, wherein the logic is further to provide the dependency information to an operating system.

Example 13 may include a method of firmware dependency checking, comprising determining version information for a new firmware component of a firmware based on corresponding self-descriptive dependency information of the new firmware component, reading dependency information corresponding to the firmware component, and determining if dependency is satisfied between the new firmware component and one or more other firmware components based on the version information and the dependency information of the new firmware component.

Example 14 may include the method of Example 13, further comprising storing the self-descriptive dependency information corresponding to the new firmware component.

Example 15 may include the method of Example 14, wherein the self-descriptive dependency information includes one or more classes of firmware components on which the new firmware component is dependent together with a range of compatible versions for each of the one or more classes of firmware components.

Example 16 may include the method of Example 13, further comprising determining if dependency is satisfied between the new firmware component and all other related firmware components based on the version information and the dependency information of the new firmware component.

Example 17 may include the method of Example 16, further comprising updating the firmware with the new firmware component if dependency is satisfied between the new firmware component and all other related firmware components.

Example 18 may include the method of any of Examples 13 to 17, further comprising providing the dependency information to an operating system.

Example 19 may include at least one computer readable medium, comprising a set of instructions, which when executed by a computing device, cause the computing device to determine version information for a new firmware component of a firmware based on corresponding self-descriptive dependency information of the new firmware component, read dependency information corresponding to the firmware component, and determine if dependency is satisfied between the new firmware component and one or more other firmware components based on the version information and the to dependency information of the new firmware component.

Example 20 may include the at least one computer readable medium of Example 19, comprising a further set of instructions, which when executed by the computing device, cause the computing device to store the self-descriptive dependency information corresponding to the new firmware component.

Example 21 may include the at least one computer readable medium of Example 20, wherein the self-descriptive dependency information includes one or more classes of firmware components on which the new firmware component is dependent together with a range of compatible versions for each of the one or more classes of firmware components.

Example 22 may include the at least one computer readable medium of Example 19, comprising a further set of instructions, which when executed by the computing device, cause the computing device to determine if dependency is satisfied between the new firmware component and all other related firmware components based on the version information and the dependency information of the new firmware component.

Example 23 may include the at least one computer readable medium of Example 22, comprising a further set of instructions, which when executed by the computing device, cause the computing device to update the firmware with the new firmware component if dependency is satisfied between the new firmware component and all other related firmware components.

Example 24 may include the at least one computer readable medium of any of Examples 19 to 23, comprising a further set of instructions, which when executed by the computing device, cause the computing device to provide the dependency information to an operating system.

Example 25 may include a firmware dependency checker apparatus, comprising means for determining version information for a new firmware component of a firmware based on corresponding self-descriptive dependency information of the new firmware component, means for reading dependency information corresponding to the firmware component, and means for determining if dependency is satisfied between the new firmware component and one or more other firmware components based on the version information and the dependency information of the new firmware component.

Example 26 may include the apparatus of Example 25, further comprising means for storing the self-descriptive dependency information corresponding to the new firmware component.

Example 27 may include the apparatus of Example 26, wherein the self-descriptive dependency information includes one or more classes of firmware components on which the new firmware component is dependent together with a range of compatible versions for each of the one or more classes of firmware components.

Example 28 may include the apparatus of Example 25, further comprising means for determining if dependency is satisfied between the new firmware component and all other related firmware components based on the version information and the dependency information of the new firmware component.

Example 29 may include the apparatus of Example 28, further comprising means for updating the firmware with the new firmware component if dependency is satisfied between the new firmware component and all other related firmware components.

Example 30 may include the apparatus of any of Examples 25 to 29, further comprising means for providing the dependency information to an operating system.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. At least one non-transitory computer readable storage medium comprising a set of instructions which, when executed, cause a computing apparatus to:
   access a firmware capsule, the firmware capsule comprising both an updated version of a first firmware component and at the same time dependency information associated with the first firmware component;
   determine from the dependency information a version dependency corresponding to a second firmware component, wherein the version dependency includes a constraint on a version number of the second firmware component;
   determine whether the version dependency corresponding to the second firmware component is satisfied; and
   update the first firmware component with the updated version if the version dependency corresponding to the second firmware component is satisfied.

2. The at least one non-transitory computer readable storage medium of claim 1, wherein to determine whether the version dependency corresponding to the second firmware component is satisfied, the instructions, when executed, cause the computing apparatus to determine whether a version number for an installed version of the second firmware component satisfies the constraint on the version number of the second firmware component.

3. The at least one non-transitory computer readable storage medium of claim 2, wherein the constraint on the version number of the second firmware component comprises a range of compatible version numbers.

4. The at least one non-transitory computer readable storage medium of claim 3, wherein to determine whether a version number for an installed version of the second firmware component satisfies the constraint on the version number of the second firmware component comprises to determine whether the version number for the installed version of the second firmware component is within the range of compatible version numbers.

5. The at least one non-transitory computer readable storage medium of claim 1, wherein the instructions, when executed, further cause the computing apparatus to:
   determine from the dependency information a second version dependency corresponding to a third firmware component, wherein the second version dependency includes a constraint on a version number of the third firmware component; and
   determine whether the second version dependency corresponding to the third firmware component is satisfied.

6. A computing system, comprising:
a processor; and
a memory coupled to the processor, the memory including a set of instructions which, when executed by the processor, cause the computing system to:
   access a firmware capsule, the firmware capsule comprising both an updated version of a first firmware component and at the same time dependency information associated with the first firmware component;
   determine from the dependency information a version dependency corresponding to a second firmware component, wherein the version dependency includes a constraint on a version number of the second firmware component;
   determine whether the version dependency corresponding to the second firmware component is satisfied; and
   update the first firmware component with the updated version if the version dependency corresponding to the second firmware component is satisfied.

7. The computing system of claim 6, wherein to determine whether the version dependency corresponding to the second firmware component is satisfied, the instructions, when executed, cause the computing system to determine whether a version number for an installed version of the second firmware component satisfies the constraint on the version number of the second firmware component.

8. The computing system of claim 7, wherein the constraint on the version number of the second firmware component comprises a range of compatible version numbers.

9. The computing system of claim 8, wherein to determine whether a version number for an installed version of the second firmware component satisfies the constraint on the version number of the second firmware component comprises to determine whether the version number for the installed version of the second firmware component is within the range of compatible version numbers.

10. The computing system of claim 6, wherein the instructions, when executed, further cause the computing system to:
    determine from the dependency information a second version dependency corresponding to a third firmware component, wherein the second version dependency includes a constraint on a version number of the third firmware component; and
    determine whether the second version dependency corresponding to the third firmware component is satisfied.

11. A method comprising:
accessing a firmware capsule, the firmware capsule comprising both an updated version of a first firmware component and at the same time dependency information associated with the first firmware component;
determining from the dependency information a version dependency corresponding to a second firmware component, wherein the version dependency includes a constraint on a version number of the second firmware component;
determining whether the version dependency corresponding to the second firmware component is satisfied; and
updating the first firmware component with the updated version if the version dependency corresponding to the second firmware component is satisfied.

12. The method of claim 11, wherein determining whether the version dependency corresponding to the second firmware component is satisfied comprises determining whether a version number for an installed version of the second firmware component satisfies the constraint on the version number of the second firmware component.

13. The method of claim 12, wherein the constraint on the version number of the second firmware component comprises a range of compatible version numbers.

14. The method of claim 13, wherein determining whether a version number for an installed version of the second firmware component satisfies the constraint on the version number of the second firmware component comprises determining whether the version number for the installed version of the second firmware component is within the range of compatible version numbers.

15. The method of claim 11, further comprising:
determining from the dependency information a second version dependency corresponding to a third firmware component, wherein the second version dependency includes a constraint on a version number of the third firmware component; and
determining whether the second version dependency corresponding to the third firmware component is satisfied.

16. An apparatus comprising:
means for accessing a firmware capsule, the firmware capsule comprising both an updated version of a first firmware component and at the same time dependency information associated with the first firmware component;
means for determining from the dependency information a version dependency corresponding to a second firmware component, wherein the version dependency includes a constraint on a version number of the second firmware component;
means for determining whether the version dependency corresponding to the second firmware component is satisfied; and
means for updating the first firmware component with the updated version if the version dependency corresponding to the second firmware component is satisfied.

17. The apparatus of claim 16, wherein determining whether the version dependency corresponding to the second firmware component is satisfied comprises determining whether a version number for an installed version of the second firmware component satisfies the constraint on the version number of the second firmware component.

18. The apparatus of claim 17, wherein the constraint on the version number of the second firmware component comprises a range of compatible version numbers.

19. The apparatus of claim 18, wherein determining whether a version number for an installed version of the second firmware component satisfies the constraint on the version number of the second firmware component comprises determining whether the version number for the installed version of the second firmware component is within the range of compatible version numbers.

20. The apparatus of claim 16, further comprising:
means for determining from the dependency information a second version dependency corresponding to a third firmware component, wherein the second version dependency includes a constraint on a version number of the third firmware component; and
means for determining whether the second version dependency corresponding to the third firmware component is satisfied.

* * * * *